2,919,258
DULLED ARTICLE CONSISTING OF A POLY-AMIDE AND A NORMAL METAL SALT OF A SATURATED ALIPHATIC DICARBOXYLIC ACID

Edward W. Pietrusza, Morristown, and Robert C. Wincklhofer, Whippany, N.J., assignors to Allied Chemical Corporation, a corporation of New York No Drawing. Application February 17, 1956
Serial No. 566,098

6 Claims. (Cl. 260—37)

This invention relates to semi-dull and dull, molecularly oriented, fusible polyamide articles, especially filaments. More especially it relates to such articles and filaments wherein the polyamide is essentially polycaprolactam.

For some uses of filaments it is desired to have a filament of subdued luster (semi-dull) or an opaque filament (dull). Many dulling agents have been proposed, both inorganic and organic. The well-known dulling agents are compounds insoluble in and incompatible with the filament-forming material and having a different index of refraction from the filament-forming material.

Of the many proposed dulling agents only a few are useful for dulling fusible polyamide filaments. These filaments are spun at high temperatures from a melt in which the dulling agent is dispersed. Hence there are stringent requirements as to uniform dispersibility of dulling agents at fine particle size and as to their heat stability. Moreover the dulling agent must be effective in small amounts so as to be economical and avoid depreciating the filament properties. A particular problem with polyamide filaments consisting essentially of polycaprolactam as the polyamide is that dulling agents frequently impair the resistance of these filaments to ageing and weathering influences such as light, heat, oxygen and ozone.

Our invention provides a uniformly dulled, molecularly oriented, fusible polyamide article which has good ageing and good weathering properties. Our dulling process provides a composition which spins well.

Our dulling agent does not appear to operate on the conventional principles whereby an inert, insoluble, incompatible pigment acts as a dulling agent for a polyamide article. Instead our dulling agent appears to be compatible, at least to some extent, with molten and with unoriented polyamide, and develops its full dulling effect only when the polyamide is cooled and molecularly oriented, e.g. by stretching. The dulling agents used in our invention in general are the colorless normal salts of a metal with a saturated aliphatic dicarboxylic acid containing between 2 and 10 carbon atoms per molecule. Representative of the metal cations of suitable salts are sodium, aluminum, calcium, cadmium, barium, and lead. For dulling polyamide filaments consisting essentially of polycaprolactam, we have found especially useful the normal salts of aluminum and calcium with adipic acid. These salts have the formulae: $Al_2[OCO(CH_2)_4COO]_3$ and $Ca[OCO(CH_2)_4COO]$ respectively.

The action of our dulling agents may be connected with dark striations which are visible under the microscope in a molecularly oriented filament in which one of our dulling agents is incorporated. With some polymers, such as polycaprolactam containing residues of an oxy acid of phosphorus, there is evidence of reaction between the dulling agent and these oxy acid residues which may have some influence on the dulling effect. Typically these residues of an oxy acid of phosphorus are present in amounts giving phosphorus content of the hot water washed polymer analyzing between about 0.01% and about 1.0% by weight. However, we do not intend to be bound by any mere theory of the action of our dulling agents.

Various methods can be used to incorporate our dulling agent in a polyamide composition to be used for forming a dull filament by the process of our invention. For example, the agents can be dispersed in the polymerization reaction mixture before polymerization or at any stage thereof; or can be dispersed in one or more ingredients of the reaction mixture, e.g. in caprolactam monomer. A particular advantage of the dulling agents of our invention is that they can be well dispersed when added to the finished polymer. For example, they can be coated on pellets, chips, or granules of the polymer in powder form by simple dry tumbling and can then be well dispersed in a melt of the thus coated polymer. Addition of the dulling agent by this dry tumbling method has the advantage of flexibility over addition to the polymerization recipe, since the same polymer can be made up into dull, semi-dull, or bright filaments, if the dulling agent is added thereto after the polymer has been made.

Another advantage of the dry tumbling method is that the time of subjecting the dulling agent and polymer composition to possible deleterious high temperatures is minimized.

Amounts of our dulling agents ordinarily used are between about 0.1 part and about 5 parts per 100 parts by weight of polyamide. Amounts of 0.5–2 parts will frequently be found to form a filament ranging from semi-dull to fully dull.

The following examples are illustrative of our invention, but our invention is not to be construed as limited to all details of the examples.

The general method used in the examples for preparing dulled yarns in accordance with our invention was as follows. The caprolactam polymer was prepared by stirring in a reaction vessel caprolactam monomer and aqueous phosphoric acid. The phosphoric acid amounted to about 0.75–1.25 parts, calculated as $H_3PO_4$ per 100 parts by weight of input caprolactam. Temperatures were increased to reach eventually about 260° C., which was maintained until most of the monomer was converted to high molecular weight polymer. About one part of water per 100 parts of input caprolactam was still present at about 220°–225° C.; then as the temperature rose to 260° C. the water was allowed to escape and mainly caprolactam monomer was refluxed.

The molten high molecular weight fiber-forming polymer thus formed was extruded as a rod from the reaction vessel and was chopped into granules about 0.05" long x 0.05" diameter. These granules were thoroughly washed with boiling water and were dried in a stream of carbon dioxide to a moisture content less than 0.1%.

Upon analysis these polyamide granules were found to contain phosphorus amounting to about 0.1% to 0.2% by weight. They imparted to water extracts a pH in the range between about 3 and about 5. The content of phosphorus, not extracted by hot water washing; and the acidity of the polymer, retained after extraction by hot water are the criteria for presence of residues of an oxy acid of phosphorus in the polymer.

The "dry tumbling" method of adding our delusterant comprised tumbling the dry granules with dry powdered normal salts, generally with powdered normal salt having average particle diameter not greater than 5 microns. The tumbling was at normal temperatures, suitably for 3 hours.

The normal salt delustering agent was prepared in general by adding the calculated quantity of aqueous metal compound, e.g. aqueous aluminum sulfate or aqueous calcium chloride, to an aqueous solution of purified disodium salt of the dicarboxylic acid; isolating the resulting water-insoluble normal metal salt of the dicarboxylic acid by filtering; and drying the product to constant weight at 110° C.

The granules coated with the powdered delustering agent were fed into a heated screw extruder wherein they were melted. The melt was forwarded by the screw to a gear type metering pump; thence the melt passed through a sand filter; and finally was extruded through a multi-hole spinneret into an air cooling tower whereby filaments were formed. The filaments at this point were lustrous, bright filaments. The good spinning characteristics of the composition were evidenced by relative freedom of the spinning operation from interruptions such as those caused by drips at the spinneret face or by broken filaments. Likewise indicative of good spinning characteristics was the slow pressure increase across the sand filter, rising typically from about 2500 p.s.i. to about 2800 p.s.i. over 3 hours when the preferred fine particle sizes of delusterant were employed having average particle diameters not greater than about 5 microns.

The unstretched filaments obtained were given an application of aqueous anti-static lubricating composition and were then stretched at room temperature between 3.75 and 4.25 fold their original length, whereby they became molecularly oriented and dulled. They were generally given a heat setting treatment and were wound up with twist to form a yarn.

Example 1

(a) Granules of phosphoric acid catalyzed polycaprolactam, prepared as above described, were coated with aluminum adipate powder by the above described dry tumbling method, using 2 parts of aluminum adipate per 100 parts by weight of polycaprolactam. The yarn was produced as above outlined. It was fully dull and white. It was 70 denier, 32 filament count. The denier uniformity indicated good spinability of the filament-forming composition, being in the range ±5%. The dulling was uniform and free of streaks.

This yarn had good affinity for acid type dyestuffs as shown by the comparatively deep shade and strong dye absorption of this yarn when this yarn and a similar commercial nylon yarn were dyed simultaneously in the same bath using a metalized azo acid type dye.

(b) The ultimate elongation (U.E.) at break of a series of yarns obtained by the foregoing procedure using 0.5 and 2 parts of aluminum adipate per 100 parts of polycaprolactam was about 20–35% beyond the unstressed length, and their ultimate tensile strength (U.T.S.) at break was about 5–6 grams per denier based on the denier of the unstressed yarn (e.g. 70 denier).

The following results are representative of the resistance of these yarns to weathering influences compared to similar polycaprolactam yarns containing the usual titanium dioxide delusterant instead of aluminum adipate; and compared to a commercial delustered nylon yarn believed to consist essentially of polyhexamethylene adipamide delustered with about 0.3% of titanium dioxide. These 4 types of yarn are indicated in the following table respectively by the headings: $Al_2Ad_3$—2.0; $Al_2Ad_3$—0.5; Nylon-6—$TiO_2$; Nylon-6,6—$TiO_2$.

$Al_2Ad_3$—2.0

|  | U.E. | U.T.S. |
| --- | --- | --- |
| Original | About 23% | About 5.5 g.p.d. |
| Percent Retained After About One Month Outdoor Exposure. | About 84% | About 88%. |

$Al_2Ad_3$—0.5

|  | U.E. | U.T.S. |
| --- | --- | --- |
| Original | About 23% | About 5 g.p.d. |
| Percent Retained After About One Month Outdoor Exposure. | About 84% | About 90%. |

Nylon-6—$TiO_2$

|  | U.E. | U.T.S. |
| --- | --- | --- |
| Original | About 28% | About 6 g.p.d. |
| Percent Retained After About One Month Outdoor Exposure. | About 33% | About 43%. |

Nylon-6,6—$TiO_2$

|  | U.E. | U.T.S. |
| --- | --- | --- |
| Original | About 18% | About 5.5 g.p.d. |
| Percent Retained After About One Month Outdoor Exposure. | About 63% | About 69%. |

The yarn of the above table containing about 2 parts of aluminum adipate per 100 parts by weight of polycaprolactam was fully dull, and that containing about 0.5 part of aluminum adipate was semi-dull, as were the yarns containing titanium dioxide.

(c) Generally similar comparisons of weathering resistance were obtained substituting for the aluminum adipate dulled yarn above, semi-dull yarns produced by adding 0.5–1 part of aluminum adipate to 100 parts of molten caprolactam polymerization reaction mixture; followed by granulating and spinning the polymer, containing the delusterant, by similar procedures to those above described.

Example 2

Calcium adipate was introduced by dry tumbling in place of the aluminum adipate present in the yarns of Example 1, using otherwise the same procedures as employed in preparing said yarns of Example 1. Yarn obtained using 2 parts of calcium adipate per 100 parts by weight of phosphoric acid catalyzed polycaprolactam was fully dull and white. The yarn obtained using 0.5 part of calcium adipate was semi-dull and white. The dulling was uniform and free of streaks. The dyeability and weatherability of these yarns is similar to that of the aluminum adipate delustered yarn of Example 1.

The following table shows the properties of these calcium adipate delustered yarns (indicated by the headings Ca—2.0 and Ca—0.5) as compared to yarns similarly produced from a phosphoric acid catalyzed polycaprolactam polymer (a) containing no delusterant and treated by washing with one normal aqueous calcium hydroxide (designated Ca(OH$_2$) in the table) and (b) containing no delusterant but having 0.5 part of adipic acid per 100 parts by weight of the polymer added by the dry tumbling method (designated "Adipic acid" in the table).

Ca—2.0

|  | U.E. | U.T.S. |
| --- | --- | --- |
| Original | About 27.5% | About 6 g.p.d. |
| Percent Retained After 8 hr. Exposure Hung in a 165° C. Oven under 0.1 gram/denier Load. | About 34% | About 52%. |

Ca—0.5

|  | U.E. | U.T.S. |
| --- | --- | --- |
| Original | About 18.5% | About 6 g.p.d. |
| Percent Retained After 8 hr. Exposure Hung in a 165° C. Oven under 0.1 gram/denier Load. | About 33% | About 39%. |

Ca(OH$_2$)

|  | U.E. | U.T.S. |
| --- | --- | --- |
| Original | About 17% | About 6 g.p.d. |
| Percent Retained After 8 hr. Exposure Hung in a 165° C. Oven under 0.1 gram/denier Load. | About 32% | About 22%. |

ADIPIC ACID

|  | U.E. | U.T.S. |
| --- | --- | --- |
| Original | About 15.5% | About 8 g.p.d. |
| Percent Retained After 8 hr. Exposure Hung in a 165° C. Oven under 0.1 gram/denier Load. | About 46% | About 26%. |

The yarns containing calcium ion to the extent introduced by the calcium hydroxide wash treatment and containing adipic acid of the above table showed no dulling. It will be observed from the table that the calcium adipate dulled yarns had better heat resistance than the yarn merely washed with calcium hydroxide.

*Example 3*

A yarn was prepared by essentially the same procedure as in Example 1, except that 0.5 part of calcium glutarate per 100 parts of phosphoric acid catalyzed polycaprolactam was used as the dulling agent. The yarn obtained was semi-dull and white. The dulling was uniform and free of streaks. The yarn showed the following properties:

|  | U.E. | U.T.S. |
| --- | --- | --- |
| Original | About 17% | About 7 g.p.d. |
| Percent Retained After 8 hr. Exposure Hung in a 165° C. Oven under 0.1 gram/denier Load. | About 48% | About 23%. |

*Example 4*

A yarn was prepared by essentially the same procedure as in Example 1, except that 2 parts of calcium oxalate per 100 parts of phosphoric acid catalyzed polycaprolactam was used as the dulling agent. The yarn obtained was semi-dull and white. The dulling was uniform and free of streaks. The yarn showed the following properties:

|  | U.E. | U.T.S. |
| --- | --- | --- |
| Original | About 15% | About 7.5 g.p.d. |
| Percent Retained After 8 hr. Exposure Hung in a 165° C. Oven under 0.1 gram/denier Load. | About 63% | About 63%. |

*Example 5*

Test yarns were prepared by essentially the same procedure as in Example 1, except that (a) cadmium adipate was used in amounts of 2 parts and 0.5 part per 100 parts by weight of phosphoric acid catalyzed polycaprolactam; and (b) barium adipate; (c) lead (plumbous) adipate; (d) sodium adipate, were used, each in amount of 2 parts per 100 parts of polymer. The yarn obtained using 2 parts of cadmium adipate was fully dull and white; and the remaining yarns of (a), (b), (c) and (d) above were semi-dull and white. The dulling in each yarn was uniform and free of streaks. These yarns showed the following properties:

Cd—2.0

|  | U.E. | U.T.S. |
| --- | --- | --- |
| Original | About 20.5% | About 5 g.p.d. |
| Percent Retained After 8 hr. Exposure Hung in a 165° C. Oven under 0.1 gram/denier Load. | About 30% | About 44%. |
| Percent Retained After 4 wks. Outdoor Exposure. | About 73% | About 87%. |

Cd—0.5

|  | U.E. | U.T.S. |
| --- | --- | --- |
| Original | About 20.5% | About 6.5 g.p.d. |
| Percent Retained After 8 hr. Exposure Hung in a 165° C. Oven under 0.1 gram/denier Load. | About 34% | About 51%. |
| Percent Retained After 4 wks. Outdoor Exposure. | Not Tested | |

Ba—2.0

|  | U.E. | U.T.S. |
| --- | --- | --- |
| Original | About 21.5% | About 6.5 g.p.d. |
| Percent Retained After 8 hr. Exposure Hung in a 165° C. Oven under 0.1 gram/denier Load. | About 25% | About 33%. |
| Percent Retained After 4 wks. Outdoor Exposure. | About 87% | About 90%. |

Pb—2.0

|  | U.E. | U.T.S. |
| --- | --- | --- |
| Original | About 12% | About 7.5 g.p.d. |
| Percent Retained After 8 hr. Exposure Hung in a 165° C. Oven under 0.1 gram/denier Load. | About 45% | About 40%. |
| Percent Retained After 4 wks. Outdoor Exposure. | About 100% | About 90%. |

Na—2.0

|  | U.E. | U.T.S. |
| --- | --- | --- |
| Original | About 15.5% | About 6 g.p.d. |
| Percent Retained After 8 hr. Exposure Hung in a 165° C. Oven under 0.1 gram/denier Load. | About 45% | About 53%. |
| Percent Retained After 4 wks. Outdoor Exposure. | About 100% | About 97%. |

*Example 6*

Normal aluminum adipate powder prepared as in Example 1 above was added by the dry tumbling method outlined preceding Example 1 to a commercial nylon molding powder. This commercial molding powder was sold under the trade designation Du Pont Nylon FM–10,001 and is indicated by the vendor to be essentially a polyhexamethylene adipamide. Two tests using, respectively, 2 parts and 0.5 part of the aluminum adipate powder per 100 parts by weight of the molding powder were made. Yarns were produced essentially by the method of Example 1. Both test yarns were semi-dull and white. The dulling was uniform and free of streaks.

*Example 7*

Tests essentially the same as in Example 6 were made using calcium adipate powder as in Example 2 above instead of aluminum adipate. The yarn obtained from the recipe containing 0.5 part of calcium adipate per 100 parts by weight of commercial nylon molding powder was semi-dull and white, and the yarn from the recipe containing 2 parts of calcium adipate was fully dull and white. The dulling of both yarns was uniform and free of streaks.

Our invention applies especially to filaments since these are the most usual molecularly oriented polyamide articles wherein dullness is required. However, the invention is applicable to any polyamide article so long as it is molecularly oriented.

We claim:

1. A semi-dull to dull molecularly oriented, fusible article of polyamide of the group consisting of polycaprolactam, polyhexamethylene adipamide and their mixtures, containing dispersed therein as dulling agent a normal metal salt of at least one saturated aliphatic dicarboxylic acid containing between 2 and 10 carbon atoms per molecule, in amounts between about 0.1 part and about 5.0 parts per 100 parts by weight of polyamide, said metal being of the group consisting of aluminum, barium, cadmium, calcium, lead and sodium.

2. An article as defined in claim 1, wherein said article is a filament and the polyamide is polycaprolactam and the normal salt dulling agent is a salt of a metal of the group consisting of aluminum, barium, cadmium, calcium, lead, and sodium; and is present in amounts between about 0.1 part and about 5.0 parts per 100 parts by weight of polycaprolactam.

3. A filament as defined in claim 2 wherein aluminum adipate is used as dulling agent in amounts between about 0.5 part and 2 parts per 100 parts by weight of polycaprolactam.

4. A filament as defined in claim 2 wherein calcium adipate is used as dulling agent in amounts between about 0.5 part and 2 parts per 100 parts by weight of polycaprolactam.

5. An article as defined in claim 1 wherein said article is a filament and the normal salt dulling agent is aluminum adipate present in amounts between about 0.1 part and about 5 parts per 100 parts by weight of polyamide.

6. An article as defined in claim 1 wherein said article is a filament and the normal salt dulling agent is calcium adipate present in amounts between about 0.1 part and about 5 parts per 100 parts by weight of polyamide.

References Cited in the file of this patent

UNITED STATES PATENTS

| | | |
|---|---|---|
| 2,205,722 | Graves | June 25, 1940 |
| 2,422,666 | Fuller | June 24, 1947 |
| 2,484,523 | McClellan | Oct. 11, 1949 |
| 2,577,915 | Piller | Dec. 11, 1951 |
| 2,612,679 | Ladisch | Oct. 7, 1952 |
| 2,674,025 | Ladisch | Apr. 6, 1954 |

OTHER REFERENCES

Speel: Textile Chemicals and Auxiliaries, Reinhold Pub. Corp., New York, New York, 1952, page 102.